UNITED STATES PATENT OFFICE.

JOSEPH CAYOCCA, OF SACRAMENTO, CALIFORNIA.

SOLDER.

1,161,612.  Specification of Letters Patent.  Patented Nov. 23, 1915.

No Drawing.  Application filed May 11, 1915.  Serial No. 27,432.

*To all whom it may concern:*

Be it known that I, JOSEPH CAYOCCA, a citizen of the United States, residing at Sacramento, in the county of Sacramento and State of California, have invented certain new and useful Improvements in Solders, of which the following is a specification.

My invention relates to solders and has for its object the provision of a solder especially designed for the soldering of aluminium metal without the use of an acid or flux and which will be non-corrosive and have the appearance of the metal treated.

There are so called aluminium solders but they are not effective, require the use of an acid or flux, and are expensive; some of them containing gold and silver and most of them using zinc, while my invention is composed of inexepensive materials, does not require the use of any acid or flux, will not tarnish or corrode, secures the parts together firmly and effectively, and has the appearance of the aluminium to which it is applied.

The component parts of my invention are tin, lead, and aluminium commingled in approximately twelve and four-fifths ounces of tin, three and one-fifth ounces of lead, and one ounce of aluminium.

In the making of my solder the ingredients are melted in the proportions stated and molded into bars of sizes for convenient handling and when cooled or set the solder is ready for use.

When it is desired to use the solder, as for instance, to join separate parts of aluminium, or repair cracks or broken parts, or make any other repair to an article made of aluminium, the edges to be joined or parts to be repaired are first thoroughly cleaned, preferably with a wire brush, and then by means of a blow torch or other source of heat the solder is melted and applied to the parts and spread by the use of any suitable blade or ordinary soldering iron which will permit the working of the melted solder. In repairing a crack or a seam the melted solder is confined in the open space of the crack or seam until it becomes cold when it will adhere to the walls and fill the space. In joining two parts together the solder unites the parts as in the ordinary soldering of metals, but in no case is any acid or flux required.

My solder is not brittle, but flexible and non-corrosive and will stand excessive strains, and will unite any aluminium parts including castings, which makes it very useful to automobile repairmen especially in the repair of broken aluminium crank cases, engine housings, and similar parts which has not been done satisfactorily if at all with the present commercial solders.

The melting point of my solder being much less than the melting point of commercial aluminium all danger of burning the article, in applying the solder, is avoided.

I do not wish to limit my invention to the exact proportions stated and claimed but those given I have found by experiments to be the most efficient.

Having thus described my invention what I claim is:

1. A solder for aluminium composed of tin, lead, and aluminium, the tin being largely in excess of the lead and aluminium.

2. A solder composed of tin, lead and aluminium in the proportion of one part aluminium to sixteen parts of tin and lead.

3. A solder consisting of twelve and four-fifths ounces of tin, three and one-fifth ounces of lead, and one ounce of aluminium.

In testimony whereof I hereto affix my signature in the presence of two witnesses.

JOSEPH CAYOCCA.

Witnesses:
  B. LEMERY,
  M. S. WAHRHAFTIG.